Jan. 23, 1940.                A. R. SMITH                2,188,194
                       ELASTIC FLUID TURBINE PLANT
                          Filed May 26, 1938
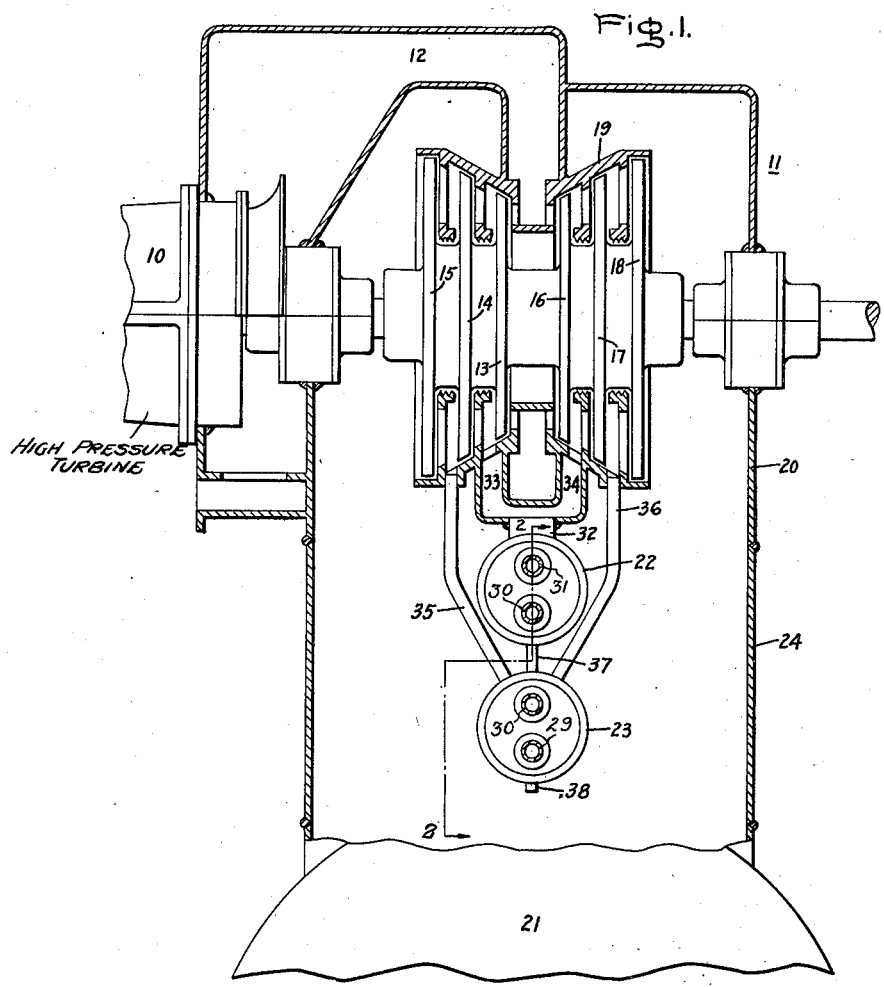
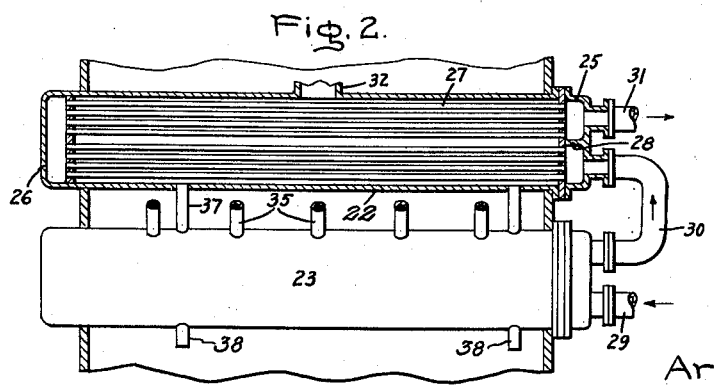
Inventor:
Arthur R. Smith,
by Harry E. Dunham
His Attorney.

Patented Jan. 23, 1940

2,188,194

UNITED STATES PATENT OFFICE 2,188,194

ELASTIC FLUID TURBINE PLANT

Arthur R. Smith, Schenectady, N. Y., assignor to General Electric Company, a corporation of New York Application May 26, 1938, Serial No. 210,203

2 Claims. (Cl. 60—67)

The present invention relates to elastic fluid turbine plants in which an extraction stage or stages of a turbine or turbines are connected to a heater such as a feed water preheater to supply heating medium thereto. More particularly the invention relates to the kind of plants in which double flow turbines are provided with intermediate stage extraction conduits for supplying heating fluid to a heater.

The object of my invention is to provide an improved construction and arrangement of power plants of the type above specified.

For a consideration of what I believe to be novel and my invention, attention is directed to the following description and the claims appended thereto in connection with the accompanying drawing.

In the drawing Fig. 1 illustrates a sectional view of a power plant arrangement embodying my invention, and Fig. 2 is a view partly in section along line 2—2 of Fig. 1.

The arrangement comprises a high pressure turbine 10 and a double flow low pressure turbine 11 mechanically coupled with the high pressure turbine 10 and arranged to receive elastic fluid exhausted from the latter by means including a cross-over conduit 12. The double flow turbine has two halves, one half having turbine wheels 13, 14 and 15 and the other half having turbine wheels 16, 17 and 18. Each half includes a nozzle diaphragm ahead of each turbine wheel and supported on a casing 19. The fluid discharged from the last turbine wheels 15 and 18 respectively of the two halves is conducted through an exhaust casing or hood 20 to a condenser 21 to be condensed therein. The general arrangement so far described is more fully set forth in the patent to Oscar Junggren, deceased, No. 2,102,416, issued December 14, 1937, and assigned to the same assignee as the present application.

The arrangement includes a heater utilizing extraction fluid from the double flow turbine and disposed in accordance with my invention in the dead space of the double flow exhaust casing, that is, in that portion of the exhaust casing through which ordinarily little exhaust elastic fluid flows on its passage to the condenser. The heater thus provided in said dead space is preferably connected to intermediate stages of both halves of the double flow turbine to assure equal flow of elastic fluid through said halves. In the present example I have shown two series connected heaters 22 and 23 for preheating liquid such as feed water to be supplied to a boiler.

The heaters have drums located in a central portion of an extension 24 of the exhaust casing 20. The heaters project through the extended exhaust casing and are supported on the walls thereof. Each heater has front and rear headers 25 and 26 respectively connected by banks of tubes 27 with a dividing wall 28 in the front header 25. Fluid to be preheated is conducted by a conduit 29 to the heater 23 and discharged therefrom through a conduit 30 connecting the header of the heater 23 in series with the header of the heater 22 so that fluid to be heated is successively passed through the heating passages formed by the heaters 23 and 22 and discharged into a conduit 31 connected to the front header of the heater 22. Heating fluid is conducted to the drum of the heater 22 by a conduit 32 which has two branches 33 and 34 respectively connected to extraction stages of the two halves of the double flow turbine. The branch 33 in the present instance receives fluid discharged from the bucket wheel 13 and the branch 34 receives fluid discharged from the bucket wheel 16. From another viewpoint, two higher stages of the two halves of the double flow turbine have parallel-connected extraction conduits 33, 34 to supply equal amounts of heating fluid to the heating drum of the heater 22. Heating fluid is conducted to the drum of the heater 23 by a plurality of conduits 35 and 36, the conduits 35 being connected to receive fluid discharged from the second stage, that is, from the turbine wheel 14 of one turbine half and the conduits 36 being connected to receive fluid discharged from the second stage, that is, from the turbine wheel 17 of the other turbine half. Thus the drum 23 receives substantially equal amounts of heating fluid from the second stage of each of the two turbine halves.

The heating fluid supplied by conduit 32 to the drum of the heater 22 is discharged therefrom through conduits 37 into the drum 23 and the heating fluid supplied through conduits 35, 36 and 37 to the drum of the heater 23 is discharged therefrom through an opening or conduit 38 into the condenser 21.

What I claim as new and desire to secure by Letters Patent of the United States is:

1. The combination of a double flow turbine having two halves each forming a plurality of stages and an exhaust casing surrounding the two halves and having an extension for receiving exhaust fluid from the two halves, a surface type heat exchanger including a drum supported on the extension and located in the dead space thereof at right angle to the axis of the turbine, and conduit means for conducting equal amounts of heating fluid from intermediate stages of both halves to the heat exchanger.

2. The combination of a double flow turbine having two halves with a plurality of stages in each half and an exhaust casing surrounding the two halves and receiving fluid exhausted from the last stages of the halves, a preheater comprising two series connected drums supported on the exhaust casing and centrally located above each other in the dead space of the exhaust casing at right angle to the axis of the turbine, conduit means connecting one of the drums to a higher stage of each half, and other conduit means connecting the other drum to a lower stage of each half to receive heating fluid therefrom.

ARTHUR R. SMITH.